US010908792B2

(12) United States Patent
Ahlberg et al.

(10) Patent No.: US 10,908,792 B2
(45) Date of Patent: Feb. 2, 2021

(54) INTERACTIVE EVENT-BASED INFORMATION SYSTEM

(71) Applicants: Christopher Ahlberg, Watertown, MA (US); Erik Wistrand, Gothenburg (SE); Johan Thoresson, Lund (SE); Staffan Truvé, Gothenburg (SE); Kaspar Weilenmann, Gothenburg (SE); Jan Sparud, Gothenburg (SE); Mia Nordström, Mölnlycke (SE)

(72) Inventors: Christopher Ahlberg, Watertown, MA (US); Erik Wistrand, Gothenburg (SE); Johan Thoresson, Lund (SE); Staffan Truvé, Gothenburg (SE); Kaspar Weilenmann, Gothenburg (SE); Jan Sparud, Gothenburg (SE); Mia Nordström, Mölnlycke (SE)

(73) Assignee: Recorded Future, Inc., Somerville, MA (US)

( * ) Notice: Subject to any disclaimer, the term of this patent is extended or adjusted under 35 U.S.C. 154(b) by 0 days.

(21) Appl. No.: 13/856,867

(22) Filed: Apr. 4, 2013

(65) Prior Publication Data

US 2014/0013233 A1 Jan. 9, 2014

Related U.S. Application Data

(60) Provisional application No. 61/620,393, filed on Apr. 4, 2012.

(51) Int. Cl.
*G06F 3/048* (2013.01)
*G06F 3/0484* (2013.01)
(Continued)

(52) U.S. Cl.
CPC ...... *G06F 3/04842* (2013.01); *G06F 16/2477* (2019.01); *G06F 16/951* (2019.01); *G06Q 10/10* (2013.01)

(58) Field of Classification Search
CPC ......... G06F 17/30884; G06F 17/30873; G06F 16/9535; G06F 3/04842; G06F 16/2477; G06F 16/951; G06Q 10/10; G06Q 30/02
See application file for complete search history.

(56) References Cited

U.S. PATENT DOCUMENTS 6,839,680 B1 * 1/2005 Liu ................... G06Q 30/0204
705/7.33
7,454,430 B1 * 11/2008 Komissarchik ... G06F 17/30719
(Continued)

*Primary Examiner* — Mahelet Shiberou
(74) *Attorney, Agent, or Firm* — Kristofer E. Elbing

(57) ABSTRACT

In one general aspect, an interactive event-based information system is disclosed that includes an event-based data store for storing information about events selectively extracted from a plurality of machine-readable information sources. A live feed extraction interface is responsive to the event-based data store and has a feed publication output operative to publish a live feed of selected information about events. A live event feed user interface includes a live feed display interface operative to present a succession of visual information elements corresponding to events covered in the live event feed, and a drill-down interface responsive to user interaction to provide access to further information about the information elements from the data store.

22 Claims, 3 Drawing Sheets

(51) Int. Cl.
*G06Q 10/10* (2012.01)
*G06F 16/951* (2019.01)
*G06F 16/2458* (2019.01)

(56) References Cited

U.S. PATENT DOCUMENTS

| | | | |
|---|---|---|---|
| 7,831,928 B1* | 11/2010 | Rose et al. | 715/810 |
| 8,224,567 B2* | 7/2012 | Dacosta | 701/409 |
| 2002/0049727 A1* | 4/2002 | Rothkopf | G06Q 30/02 |
| 2005/0060312 A1* | 3/2005 | Curtiss et al. | 707/7 |
| 2005/0165743 A1* | 7/2005 | Bharat | G06F 17/30867 |
| 2006/0031114 A1* | 2/2006 | Zommers | G06Q 10/06314 |
| | | | 705/7.24 |
| 2008/0103799 A1* | 5/2008 | Domenikos | G06Q 40/08 |
| | | | 705/318 |
| 2008/0215546 A1* | 9/2008 | Baum | G06F 17/30551 |
| 2009/0049038 A1* | 2/2009 | Gross | 707/5 |
| 2009/0132581 A1* | 5/2009 | Ahlberg | 707/102 |
| 2009/0248516 A1* | 10/2009 | Gross | 705/14 |
| 2010/0083124 A1* | 4/2010 | Druzgalski | G06F 17/3087 |
| | | | 715/738 |
| 2011/0029636 A1* | 2/2011 | Smyth | G06F 17/3089 |
| | | | 709/217 |
| 2012/0005215 A1* | 1/2012 | Chow | G06Q 50/01 |
| | | | 707/748 |
| 2013/0238356 A1* | 9/2013 | Torii | G06Q 10/06 |
| | | | 705/2 |
| 2013/0238989 A1* | 9/2013 | Chu | G06F 17/30867 |
| | | | 715/273 |

\* cited by examiner

INTERACTIVE EVENT-BASED INFORMATION SYSTEM

CROSS-REFERENCE TO RELATED APPLICATION

This application claims the benefit under 35 U.S.C. 119(e) of U.S. provisional application Ser. No. 61/620,393 filed Apr. 4, 2012, which is herein incorporated by reference. This application is also related to U.S. Application Nos. 20100299324 and 20090132582 both entitled INFORMATION SERVICE FOR FACTS EXTRACTED FROM DIFFERING SOURCES ON A WIDE AREA NETWORK as well as to U.S. Application Ser. No. 61/550,371 entitled SEARCH ACTIVITY PREDICTION and to U.S. Application Ser. No. 61/563,528 entitled AUTOMATED PREDICTIVE SCORING IN EVENT COLLECTION, which are all herein incorporated by reference.

FIELD OF THE INVENTION

This invention relates to an apparatus and method for interactively providing access to event-based information.

BACKGROUND OF THE INVENTION

The above-referenced applications provide a framework for predicting facts from sources such as internet news sources.

SUMMARY OF THE INVENTION

In one general aspect, the invention features an interactive event-based information system that includes an event-based data store for storing information about events selectively extracted from a plurality of machine-readable information sources. A live feed extraction interface is responsive to the event-based data store and has a feed publication output operative to publish a live feed of selected information about events. A live event feed user interface includes a live feed display interface operative to present a succession of visual information elements corresponding to events covered in the live event feed, and a drill-down interface responsive to user interaction to provide access to further information about the information elements from the data store.

In preferred embodiments the live event feed user interface can further include an analysis publication input responsive to user input to add information to the event-based data store for publication to the live event feed. The system can include analysis authoring tools responsive to user interaction to insert references to information about events in the data store to the added information. The live-feed display interface can present a continuous succession of story items. The drill-down interface can include a story-item-based drill-down tool. The drill-down interface can include a map-based drill-down tool.

In another general aspect, the invention features a method of interacting with event-based information that includes storing event-based information, continuously selecting and extracting information about events from the stored event-based information, continuously publishing the extracted information as a live event stream, receiving drill-down input from users that reference the published information in the event stream, and providing access to further stored event-based information stored in the step of storing in response to the drill-down input. In preferred embodiments, the method can further include receiving analysis items from users and publishing them to the event stream.

BRIEF DESCRIPTION OF THE DRAWING

FIG. 2 is a screenshot of an illustrative interactive event screen for the system of FIG. 1; and FIG. 3 is a screenshot of an illustrative drill-down information screen for the system of FIG. 1.

DETAILED DESCRIPTION OF AN ILLUSTRATIVE EMBODIMENT

Figure 1:
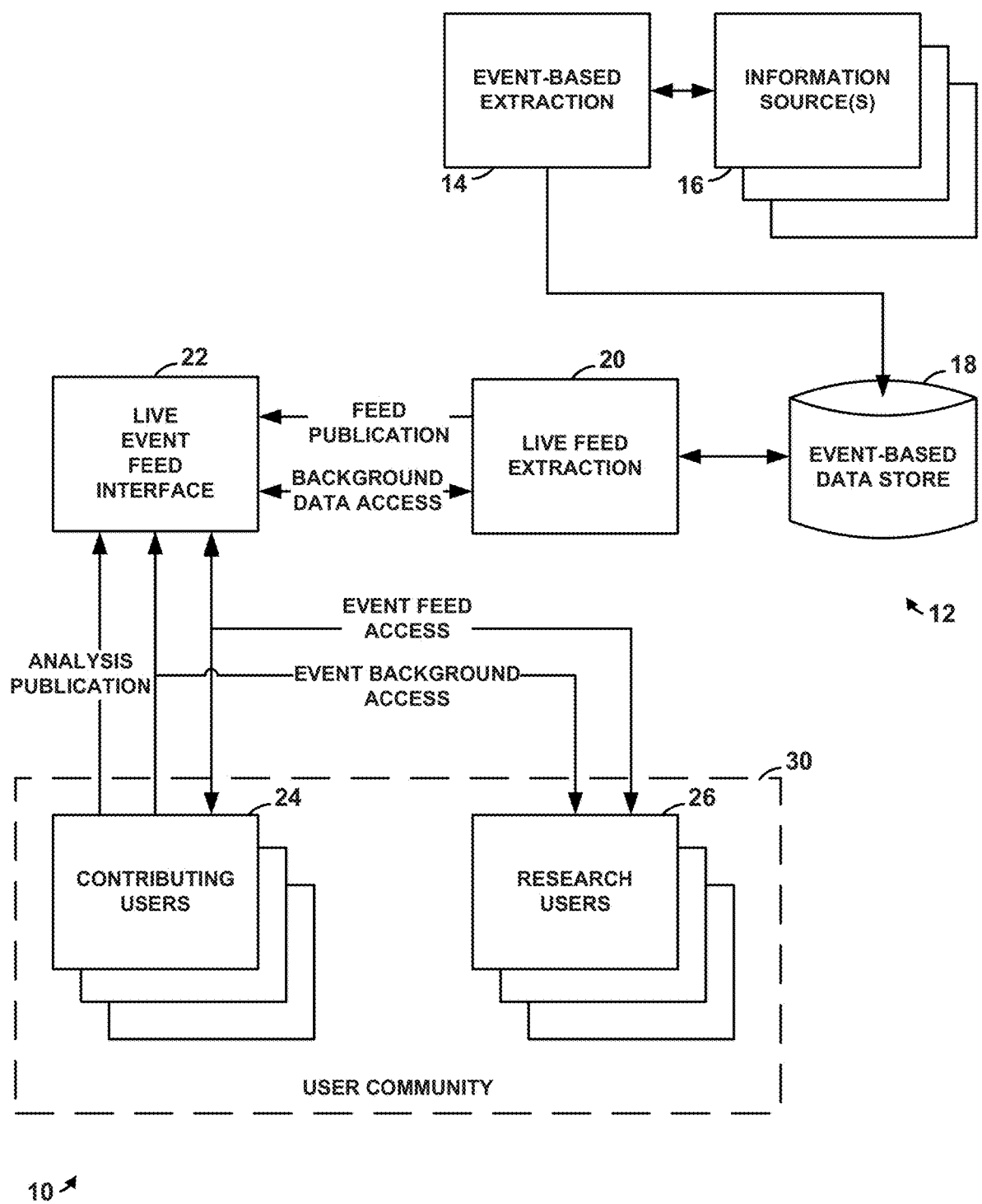
FIG. 1 is a block diagram of an illustrative interactive event-based information system according to the invention.

Referring to FIG. 1, an illustrative interactive event-based information system 10 according to the invention includes a event-based extraction system 12 uses event-bases extraction logic 14 to extract facts from information sources 16, such as on-line news sources, and stores them in an event-based data store 18. The extraction can be performed in a number of ways, including those presented in the above-referenced applications. In one embodiment the Recorded Future API is used. The Recorded Future API enables building analytic applications and performing analysis which is aware of events happening around the globe 24×7, with extensive historical records. Queries can be performed and results received from the Recorded Future Temporal Analytics Engine across a vast set of events, entities, and time points spanning from the far past into the future. The Recorded Future API is described in more detail in above-referenced application No. 61/550,371, which is herein incorporated by reference, and its published counterpart, US Patent Publication No. 2014-0114941. This system provides a live updated dataset of computationally extracted, canonical and clustered, events (i.e. meaningfully grouping multiple reporting on the same events) from many media sources and across many types.

The canonical and clustered events correspond to "real world events," broken down by appropriate time period. I.e., all the natural disaster reports around Hurricane Irene can become grouped into an event cluster. Such clustered/canonical events are for simplicity referred to as events in this document.

The system 10 also includes live feed extraction logic 20 that extracts salient events from the event-based data store 18 for publication. This extraction can be performed in a number of ways depending on what is considered salient for a particular user group. In one illustrative embodiment, the extraction logic is optimized to extract events relating to international geopolitical events from information sources that can be tailored to this subject matter area. Other event-based subject matter areas could also be monitored, such as finance, national politics, and/or celebrity news, and other types of specialized events that might not be thought of as newsworthy in all but a small or even private circle could be monitored as well, such as climactic events, intelligence reports, or computer security breaches.

Figure 2:
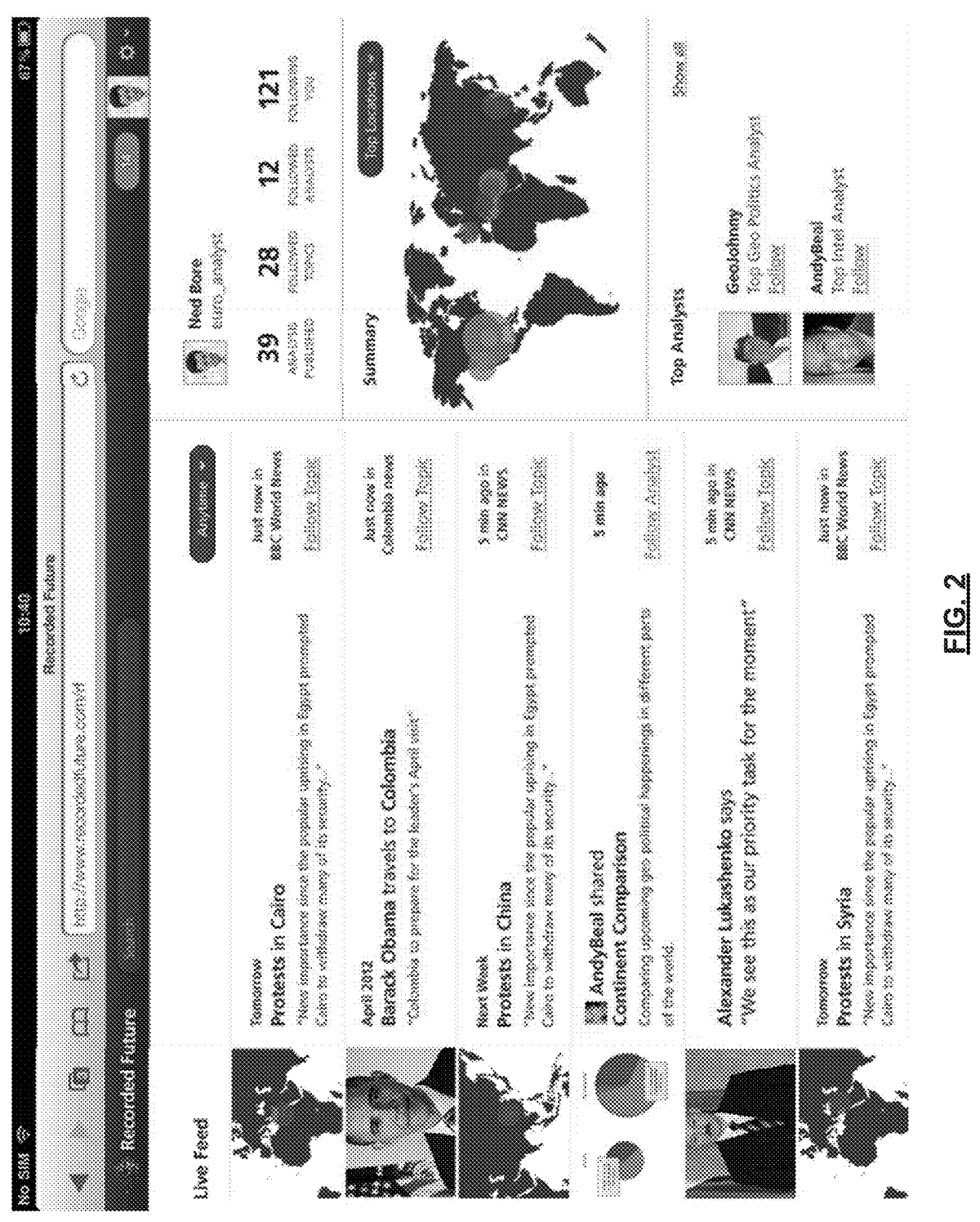

Referring also to FIG. 2, the live feed extraction logic 20 continuously monitors the event based data store 18 and provides extracted publication information about events that meet predetermined threshold criteria to a live feed interface 22 for publication. This interface is typically a browser-based interactive information presentation tool that can present information to users and receive input from them. The live event feed interface presents the extracted publication in a publication display area of the screen, preferably continuously. It should also preferably provide fresh information, although the required publication speed may vary depending on the type of subject matter accessed.

In the present embodiment, the information takes the form of a downwardly scrolling stream of story units that can each include a picture and text, although other methods of presentation could also be devised. Also provided are one or more interactive tools that allow the user to drill down into information that relates to published stories, follow analyst users, or adjust system preferences. Automated user profiling tools can also be provided, to tailor the publication of stories for individual users based on their usage.

Figure 3:
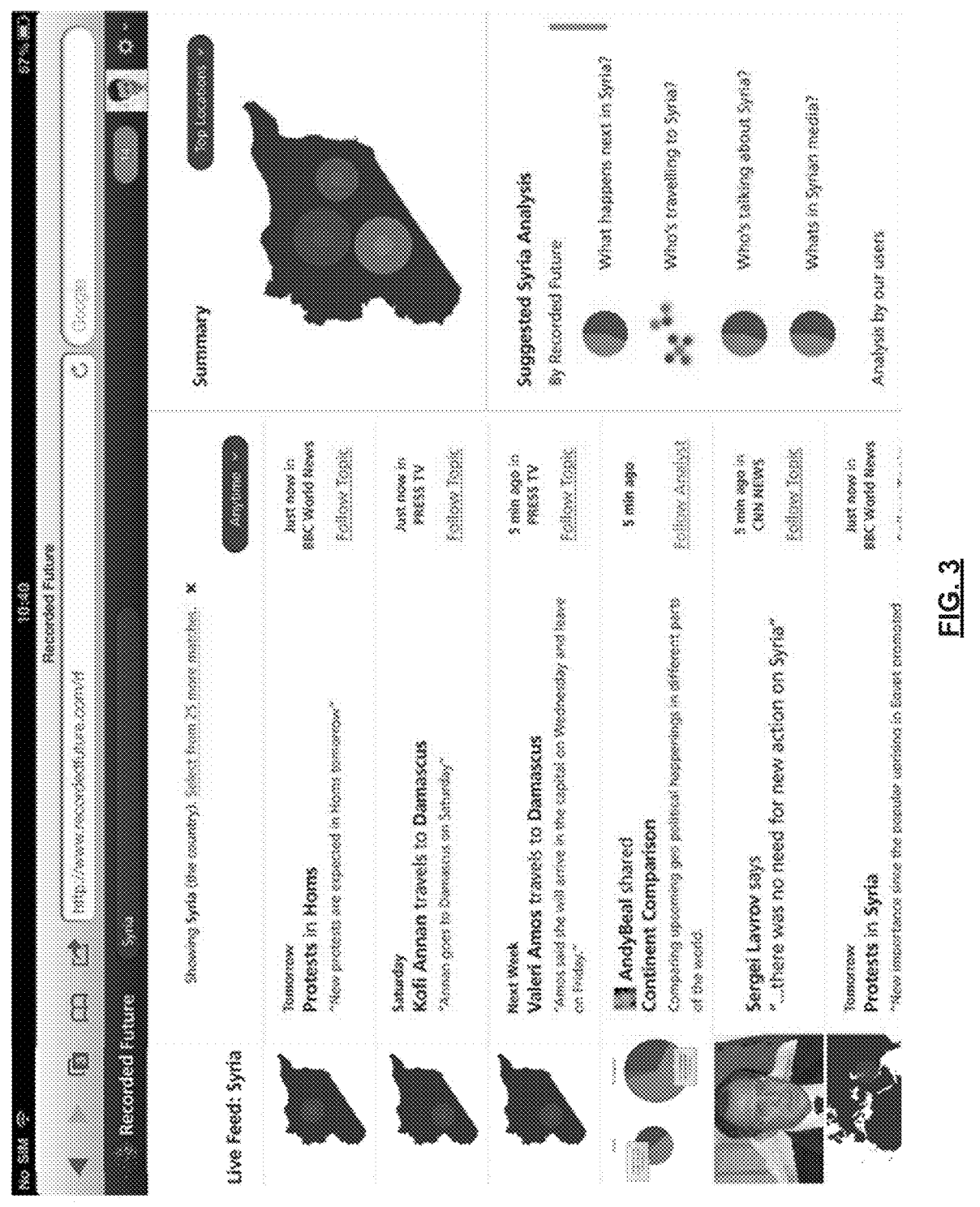

Referring also to FIG. 3, the drill-down tool(s) allow the user to extract further information about the displayed events from the event-based data store 18. These can operate by interaction with the story units (e.g., by clicking on them) or by other approaches, such as by interaction with a map-based drill-down interface. If a user is interested in information about developments in Syria, for example, he or she might explore information about events in different parts of the country using the map interface. Some users (i.e., research users) might be content to just use the system in this way.

Other users (i.e., analyst users) might also want to post further information, such as an analysis of information that that user has authored based on his or her interactions with the system. These posts can be stored in the data store for drill-down access and/or posted in the publication feed to all users or to users who choose to follow a particular analyst. Depending on the design objectives of the system, the system can provide an admission test to analysts or it can allow all users in the user base to submit analyses.

The system can facilitate the inclusion in analyses of references to other event-based information in the event-based data store. This can help to ensure that conclusions in the analyses are clearly supported by facts and to allow readers of the analyses to be meaningfully guided through them. This referencing can be encouraged by providing dedicated authoring tools that easily allow users to insert references, such as links to event-based data, including story items or other analysis posts.

The system described above has been implemented in connection with a special-purpose software program running on a general-purpose computer platform, but it could also be implemented in whole or in part using special-purpose hardware. And while the system can be broken into the series of modules and steps shown in the various figures for illustration purposes, one of ordinary skill in the art would recognize that it is also possible to combine them and/or split them differently to achieve a different breakdown.

The present invention has now been described in connection with a number of specific embodiments thereof. However, numerous modifications which are contemplated as falling within the scope of the present invention should now be apparent to those skilled in the art. Therefore, it is intended that the scope of the present invention be limited only by the scope of the claims appended hereto. In addition, the order of presentation of the claims should not be construed to limit the scope of any particular term in the claims.

What is claimed is:

1. An interactive event-based information system including a processor and a storage device including instructions configured to run on the processor, comprising:
   an event-based data store for storing information items about events selectively extracted from a plurality of machine-readable information sources, wherein the event-based data store groups pluralities of the information items from different ones of the machine-readable information sources that each correspond to the same events,
   a live feed extraction interface responsive to the event-based data store and having a feed publication output operative to publish a live feed of selected information items about events, and
   a plurality of live event feed user interfaces for a plurality of users, wherein each live event feed user interface includes:
      a live feed display interface operative to present a succession of visual information elements corresponding to information items that correspond to events covered in the live event feed,
      a profiling tool to individually tailor the publication of stories for the user of the live feed user interface,
      an analysis publication input responsive to user input to add information to the event-based data store for publication to the live event feed, and
      a drill-down interface responsive to user interaction to provide access to further information about the information items from the data store, including stored posts added to the event-based data store for publication to the live event feed through the analysis publication input.

2. The system of claim 1 wherein the system includes analysis authoring tools responsive to user interaction to insert references to information about events in the data store to the added information.

3. The system of claim 1 wherein the live-feed display interface presents a continuous succession of story items.

4. The system of claim 3 wherein the drill-down interface includes a story-item-based drill-down tool.

5. The system of claim 1 wherein the drill-down interface includes a map-based drill-down tool.

6. The system of claim 1 wherein the event-based data store is operative to store information items for at least some future events.

7. The system of claim 1 wherein the event-based data store is for storing information about computer security breaches.

8. The system of claim 7 wherein the system is operative to provide an admission test to a user before the user can add information to the event-based data store for publication to the live event feed using the analysis publication input.

9. The system of claim 1 wherein the system is operative to provide an admission test to a user before the user can add information to the event-based data store for publication to the live event feed using the analysis publication input.

10. A method of interacting with event-based information, comprising:
   storing event-based information items,
   continuously selecting and extracting information items about events from the stored event-based information items,
   grouping information items selected and extracted from different sources that each correspond to the same events,
   continuously publishing the extracted information items as a live event stream, tailoring the publication of stories for individual users,
   providing access to further stored event-based information items stored in the step of storing in response to the drill-down input,
   receiving analysis items from the users and publishing them to the event stream, and receiving drill-down input from users that reference the published information items that correspond to events in the event stream and allow access to information about the referenced items including the received analysis items.

11. The method of claim 10 wherein the step of continuously selecting and extracting continuously selects and extracts information items for at least some future events.

12. The method of claim 10 wherein the steps of storing, selecting, and grouping are applied to computer security breaches.

13. The method of claim 12 further including providing an admission test to users before publishing analysis items from them to the event stream.

14. The method of claim 10 further including providing an admission test to users before publishing analysis items from them to the event stream.

15. An interactive event-based information system including a processor and a storage device including instructions configured to run on the processor, comprising:
- an event-based data store for storing information items about events selectively extracted from a plurality of machine-readable information sources, wherein the event-based data store groups pluralities of the information items from different ones of the machine-readable information sources that each correspond to the same events, and wherein the event-based data store is operative to store information items for at least some future events,
- a live feed extraction interface responsive to the event-based data store and having a feed publication output operative to publish a live feed of selected information items corresponding to events, and
- a live event feed user interface, including
  - a live feed display interface operative to present a succession of visual information elements corresponding to information items that correspond to events covered in the live event feed,
  - an analysis publication input responsive to user input to add information to the event-based data store for publication to the live event feed, and
  - a drill-down interface responsive to user interaction to provide access to further information about the information items from the data store, including stored posts added to the event-based data store for publication to the live event feed through the analysis publication input.

16. The system of claim 15 wherein the system includes analysis authoring tools responsive to user interaction to insert references to information about events in the data store to the added information.

17. The system of claim 15 wherein the live-feed display interface presents a continuous succession of story items.

18. The system of claim 17 wherein the drill-down interface includes a story-item-based drill-down tool.

19. The system of claim 15 wherein the drill-down interface includes a map-based drill-down tool.

20. The system of claim 15 wherein the event-based data store is for storing information about at least some future computer security breaches.

21. A method of interacting with event-based information, comprising:
- storing event-based information items,
- continuously selecting and extracting information items about events from the stored event-based information, wherein the step of continuously selecting and extracting continuously selects and extracts information for at least some future events,
- grouping pluralities of the information items selected and extracted from different sources that each correspond to the same events,
- continuously publishing the extracted information as a live event stream,
- providing access to further stored event-based information items stored in the step of storing in response to the drill-down input,
- receiving analysis items from users and publishing them to the event stream, and
- receiving drill-down input from users that reference the published information in the event stream, and allow access to information about the referenced published information including the received analysis items.

22. The method of claim 21 wherein the steps of storing, selecting, and grouping are applied to at least some future computer security breaches.

* * * * *